US011259348B2

(12) United States Patent
Ganesan et al.

(10) Patent No.: US 11,259,348 B2
(45) Date of Patent: Feb. 22, 2022

(54) REMOTE WIRELESS NETWORK SETUP WITHOUT PAIRING

(71) Applicant: Sling Media Pvt. Ltd., Bangalore (IN)

(72) Inventors: Vimalraj Ganesan, Bangalore (IN); Prakhar Jaiswal, Bangalore (IN)

(73) Assignee: Sling Media Pvt. Ltd., Bangalore (IN)

( * ) Notice: Subject to any disclaimer, the term of this patent is extended or adjusted under 35 U.S.C. 154(b) by 159 days.

(21) Appl. No.: 16/588,275

(22) Filed: Sep. 30, 2019

(65) Prior Publication Data

US 2021/0051742 A1 Feb. 18, 2021

(30) Foreign Application Priority Data

Aug. 14, 2019 (IN) .............................. 201941032892

(51) Int. Cl.
| | | |
|---|---|---|
| *H04W 76/14* | (2018.01) | |
| *H04W 8/00* | (2009.01) | |
| *H04W 12/06* | (2021.01) | |
| *H04W 4/80* | (2018.01) | |
| *H04W 48/16* | (2009.01) | |

(Continued)

(52) U.S. Cl.
CPC ............. *H04W 76/14* (2018.02); *H04W 4/80* (2018.02); *H04W 8/005* (2013.01);
(Continued)

(58) Field of Classification Search
CPC ..... H04W 48/16; H04W 8/005; H04W 12/06; H04W 12/50; H04W 4/80; H04W 76/11;
(Continued)

(56) References Cited

U.S. PATENT DOCUMENTS 8,646,104 B2 2/2014 Schneider
10,383,037 B1 8/2019 Patwardhan et al.
(Continued)

FOREIGN PATENT DOCUMENTS

| EP | 3 413 634 A1 | 12/2018 |
|---|---|---|
| WO | 2018/104006 A1 | 6/2018 |
| WO | 2018/172797 A1 | 9/2018 |

OTHER PUBLICATIONS

International Search Report and Written Opinion for PCT/US2020/047873 dated Oct. 5, 2020, all pages.
(Continued)

*Primary Examiner* — Kevin C. Harper
*Assistant Examiner* — Derrick V Rose
(74) *Attorney, Agent, or Firm* — Kilpatrick Townsend & Stockton LLP

(57) ABSTRACT

Various arrangements for performing setup of a wireless network without pairing are provided. A request mapped to a first characteristic may be transmitted using a first wireless protocol. In response to the request mapped to the first characteristic, a listing of one or more wireless networks within range mapped to a second characteristic may be transmitted by a peripheral device. Using the first wireless communication protocol, a third characteristic mapped to the selected wireless network and the password may be transmitted to the peripheral device. A connection to the selected wireless network using the password and the second wireless communication protocol may then be performed by the peripheral device.

18 Claims, 6 Drawing Sheets

(51) Int. Cl.
*H04W 76/11* (2018.01)
*H04W 80/02* (2009.01)

(52) U.S. Cl.
CPC ......... *H04W 12/068* (2021.01); *H04W 48/16* (2013.01); *H04W 76/11* (2018.02); *H04W 80/02* (2013.01)

(58) Field of Classification Search
CPC ..... H04W 76/14; H04W 80/02; H04W 84/12; H04W 12/068; H04W 4/50; H04W 76/10; H04L 63/083; H04L 63/0853; H04L 41/00
See application file for complete search history.

(56) References Cited

U.S. PATENT DOCUMENTS

| | | |
|---|---|---|
| 2006/0291660 A1 | 12/2006 | Gehrmann et al. |
| 2008/0250151 A1 | 10/2008 | Tomita |
| 2013/0042292 A1 | 2/2013 | Buff et al. |
| 2014/0162619 A1 | 6/2014 | Nicholson et al. |
| 2014/0191909 A1 | 7/2014 | Tinaphong et al. |
| 2014/0344689 A1* | 11/2014 | Scott ................. G06F 3/0484 715/716 |
| 2015/0097689 A1 | 4/2015 | Logue et al. |
| 2016/0094994 A1* | 3/2016 | Kirkby ............. G06K 9/00711 380/270 |
| 2017/0118638 A1 | 4/2017 | Zhang et al. |
| 2018/0206117 A1 | 7/2018 | Stahl |
| 2019/0116087 A1 | 4/2019 | Hiller |
| 2019/0394643 A1 | 12/2019 | Townend |
| 2020/0084630 A1 | 3/2020 | Pan et al. |

OTHER PUBLICATIONS

International Search Report and Written Opinion for PCT/IN2020/050694 dated Nov. 23, 2020, all pages.

\* cited by examiner

REMOTE WIRELESS NETWORK SETUP WITHOUT PAIRING

CROSS-REFERENCE TO RELATED APPLICATION

This application claims priority to Indian Application No. 201941032892, filed Aug. 14, 2019, entitled "Remote Wireless Network Setup Without Pairing," the disclosure of which is hereby incorporated by reference in its entirety for all purposes.

BACKGROUND

Setting up a wireless network, such as a WiFi network, on a wireless device for the first time can be inefficient and frustrating for a user. Setup can be especially frustrating if the wireless device being configured does not have a convenient user interface to enter wireless network credentials. For instance, a headless wireless device can function without a graphical user interface or may not have a direct output that can be rendered on a display device, such as a television. Rather, a headless device may receive input and provide output through other interfaces such as a network interface or a serial port.

SUMMARY

Various embodiments are described related to a method for performing wireless network setup without pairing. In some embodiments, a method for performing wireless network setup without pairing is described. The method may comprise scanning, by a client device, for a peripheral device that may be advertising a wireless connection using a first wireless communication protocol. The method may comprise identifying, by the client device, the peripheral device that may be advertising the wireless connection using the first wireless communication protocol. The method may comprise, after identifying the peripheral device and without pairing with the peripheral device, transmitting, by the client device, using the first wireless communication protocol, a request mapped to a first characteristic. The method may include, in response to the request mapped to the first characteristic, transmitting, by the peripheral device, using the first wireless communication protocol, a listing of one or more wireless networks within range mapped to a second characteristic. Each wireless network of the one or more wireless networks may use a second wireless communication protocol. The method may comprise receiving, by the client device, input selecting a wireless network from the one or more wireless networks and input indicating a password of the wireless network. The method may comprise transmitting, by the client device, using the first wireless communication protocol, a third characteristic mapped to the selected wireless network and the password. The method may comprise connecting, by the peripheral device, to the selected wireless network using the password and the second wireless communication protocol.

Embodiments of such a method may include one or more of the following features: scanning for the peripheral device that may be advertising the wireless connection using the first wireless communication protocol may comprise scanning within a defined range of device addresses. A peripheral device control application installed on the client device may identify the peripheral device that may be advertising the wireless connection using the first wireless communication protocol. The first wireless communication protocol may be Bluetooth Low Energy (BLE) and the second wireless communication protocol may be an IEEE 802.11 protocol. The first characteristic, the second characteristic, and the third characteristic may be each universally unique identifiers (UUIDs). The method may further comprise transmitting, by the peripheral device, using the first wireless communication protocol, a fourth characteristic mapped to wireless network status data for the second wireless communication protocol. The method may further comprise presenting, by the client device, a first graphical user interface that may allow a user to select the wireless network from the listing of one or more wireless networks within range of the peripheral device. The method may further comprise receiving, by the client device, selection of the wireless network from the first graphical user interface. The method may further comprise presenting, by the client device, a second graphical user interface that may allow the user to input the password for the wireless network. The peripheral device may be a headless device. The peripheral device may further be a streaming media player configured to connect with a television. The client device may be a smartphone.

In some embodiments, a system for performing wireless network setup without pairing is described. The system may comprise a client device. The client device may comprise a first wireless communication interface that communicates using a first wireless communication protocol. The client device may comprise a user interface. The client device may comprise one or more processors that communicate with the first wireless communication interface and the user interface. The one or more processors may be configured to scan, using the first wireless communication interface, for a peripheral device that may be advertising a wireless connection using the first wireless communication protocol. The one or more processors may be configured to identify the peripheral device that may be advertising the wireless connection using the first wireless communication protocol. The one or more processors may be configured to, after identifying the peripheral device and without pairing with the peripheral device, cause a request mapped to a first characteristic to be transmitted by the first wireless communication interface using the first wireless communication protocol. The one or more processors may be configured to cause a third characteristic mapped to a selected wireless communication and a password to be transmitted to the peripheral device via the first wireless communication interface using the first wireless communication protocol. The system may comprise the peripheral device. The peripheral device may comprise a second wireless communication interface that communicates using the first wireless communication protocol. The peripheral device may comprise a third wireless communication interface that communicates using a second wireless communication protocol. The peripheral device may comprise one or more processors in communication with the second wireless communication interface and the third wireless communication interface. The one or more processors may be configured to, in response to receiving the request mapped to the first characteristic, cause a listing of one or more wireless networks mapped to a second characteristic to be transmitted using the second wireless communication interface. Each wireless network of the one or more wireless networks may use the second wireless communication protocol and may be within range of the second wireless communication interface. The one or more processors may be configured to receive the third characteristic mapped to the selected wireless communication and the password via the second wireless communication interface using the first wireless communication protocol. The one or more processors may be configured to connect to the selected wireless network using the password and the third wireless communication interface.

Embodiments of such a system may include one or more of the following features: the one or more processors of the client device being configured to scan for the peripheral device that may be advertising the wireless connection using the first communication protocol may comprise the one or more processors being configured to select the peripheral device based on an identifier of the peripheral device being within a defined range of MAC (Media Access Control) addresses or Bluetooth addresses. The system may further comprise a peripheral device control application installed on the client device that identifies the peripheral device that may be advertising the wireless connection using the first wireless communication protocol. The first wireless communication protocol may be Bluetooth Low Energy (BLE) and the second wireless communication protocol may be an IEEE 802.11 protocol. The first characteristic, the second characteristic, and the third characteristic may each be universally unique identifiers (UUIDs). The one or more processors of the peripheral device may be further configured to cause a fourth characteristic mapped to second wireless communication protocol status data to be transmitted using the second wireless communication interface. The one or more processors of the client device may be further configured to cause the user interface to present a first graphical user interface that may allow a user to select the wireless network from the listing of one or more wireless networks within range of the peripheral device. The one or more processors of the client device may be further configured to receive selection of the wireless network from the first graphical user interface. The one or more processors of the client device may be further configured to cause the user interface to present a second graphical user interface that may allow the user to input the password for the wireless network. The peripheral device may be a headless device. The peripheral device may be further a streaming media player comprising a port for use in outputting video to a television. The client device may be a smartphone.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A user may have a wireless device that requires network credentials in order to access a wireless network, such as a Wi-Fi network that uses an IEEE 802.11 protocol. The wireless device may not have a convenient (or any) user interface that allows a user to provide the network credentials, such as an SSID (service set identifier) and password. For example, the wireless device may be a headless device that does not have a display or user interface. Alternatively, the available user interface may be relatively inconvenient, such as an on-screen keyboard that would require navigation using a cursor or arrow keys on a remote control.

A wireless communication protocol that allows for communication between wireless devices without pairing can be leveraged to provide network credentials. For instance, Bluetooth Low Energy (BLE) may allow for communication between wireless devices without a pairing process being performed to establish encryption. By leveraging such pair-free wireless communication, a user can use a wireless device that has a convenient user interface (e.g., a touch-screen keyboard) to input credentials for the wireless network to be used by the wireless device being set up.

As detailed herein, arrangements are presented in which various characteristics are read and written to by a client device (the device being used by the user to facilitate set up) and a peripheral device (the device being configured to communicate with the wireless network). A possible embodiment involves a smartphone being used as the client device and communicating with a media streaming device that is the peripheral device. The characteristics may be in the form of UUIDs (universally unique identifiers), which can be exchanged via BLE (or, possibly, some other form of direct wireless communication protocol) without pairing having been performed.

Figure 1:
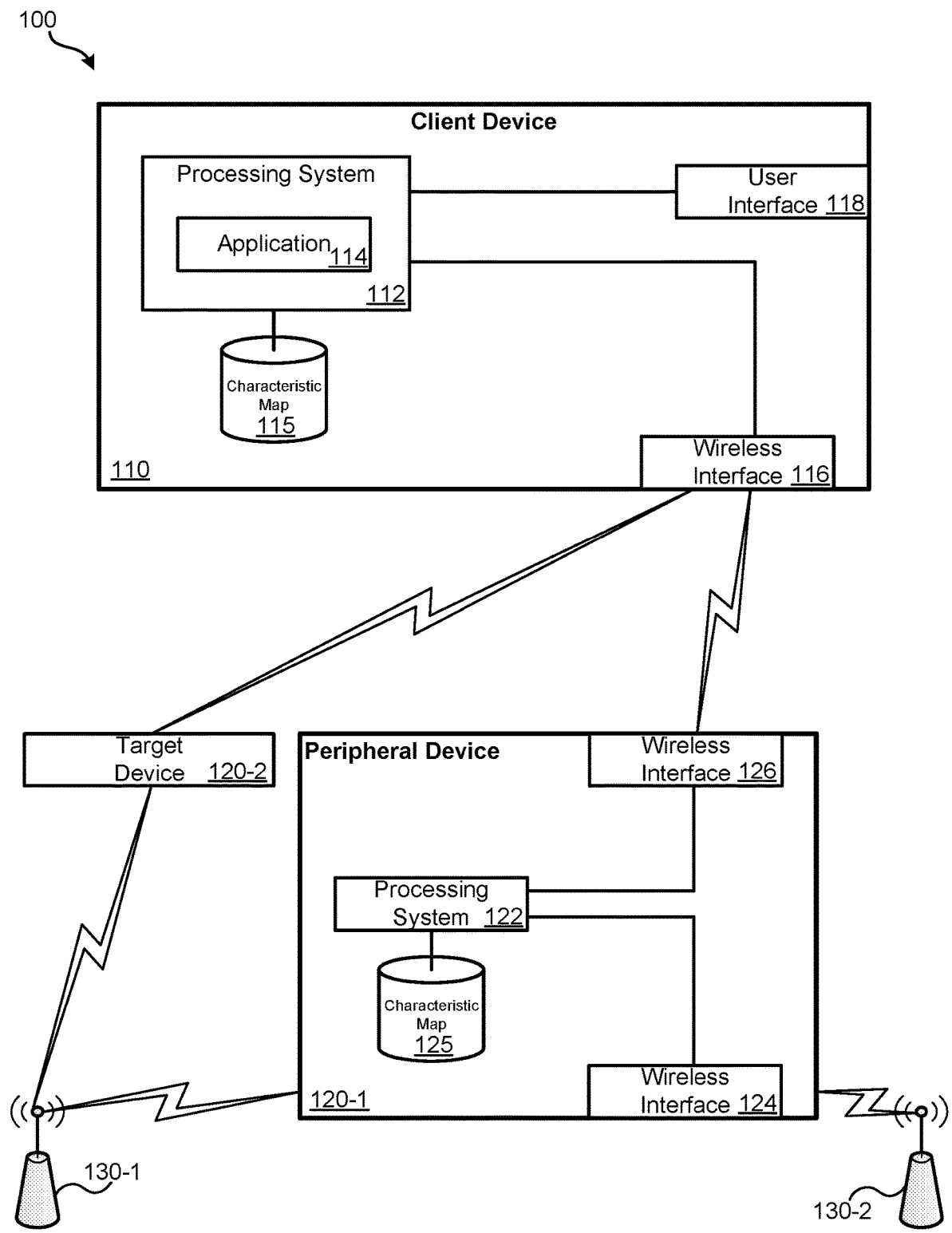
FIG. 1 illustrates a block diagram of an embodiment of a system for performing remote wireless network setup without pairing.

Further detail is provided in relation to the figures. FIG. 1 illustrates a block diagram of an embodiment of a system 100 for performing remote wireless network setup without pairing. System 100 can include: client device 110; peripheral devices 120; and wireless network access points 130. In system 100, client device 110 is used to configure one or more peripheral devices 120. Peripheral devices 120 are devices that require wireless network credentials that will permit peripheral devices 120 to access the wireless network. In some embodiments, client device 110 may communicate with multiple peripheral devices 120 such that wireless network credentials can be provided to each of peripheral devices 120. In the illustrated embodiment of system 100, two peripheral devices 120 are present; in other embodiments, more than two peripheral devices 120 may require to be set up. In other embodiments, client device 110 can communicate with a single peripheral device (such as peripheral device 120-1) to provide wireless network credentials.

Peripheral devices 120 may or may not have a user interface. For instance, peripheral devices 120 may not include or be in communication with a keyboard, touch-screen, or other form of user interface that allows for text to be easily input. One or more of peripheral devices 120 may be headless devices. A headless wireless device can function without a graphical user interface or may not have a direct output that can be rendered on a display device, such as a television. Rather, a headless device may receive input and provide output through another interface, such as a network interface. Peripheral devices 120 may be capable of outputting an indirect user interface, such as an on-screen keyboard that is output for presentation to a television or other form of display device that is separate from the peripheral device. A remote control may be used to navigate on the on-screen keyboard allowing a user to use arrow keys on the remote control to input text. A possible example of a headless peripheral device may be a streaming media player. Such a streaming media player may connect to a television, such as via an HDMI (High-Definition Multimedia Interface) port. The streaming media player may have no direct user interface, but may rather rely on an external television to present information to a user. Such a streaming media player may be capable of receiving streaming media over a wireless network and outputting the streaming media for presentation to a television and/or audio system. Such streaming media can include on-demand content, live television channels, pay-per-view (PPV) content, and/or over-the-air (OTA) television channels received by a separate device connected with an OTA antenna on the same wireless network. Other forms of peripheral devices 120 are also possible, such as home automation devices (e.g., security cameras, audio players, home assistants, smoke alarms, door bells, etc.), parking space sensors, sensors, and other IoT (Internet of Things) devices.

Client device 110 may be a device that has a convenient user interface. For example, smartphones, tablet computers, and gaming devices may function as client device 110. Client device 110 can have a touchscreen display that allows a user to type directly on a touchscreen keyboard. Client devices may additionally or alternatively have physical keyboards and/or some other form of user interface that allows a user to easily input text. Client device 110 can include: processing system 112; a non-transitory processor-readable medium that stores characteristic map 115; wireless interface 116; and user interface 118.

Wireless interface 116 may use a direct wireless communication protocol that allows for communication with one or more other wireless devices without requiring a pairing process to be completed. Pairing refers to an exchange of security features which allows a security key to be exchanged and an encrypted connection to be established between the two devices communicating wirelessly. Wireless interface 116 may use BLE as a communication protocol. BLE may allow for direct wireless communication with other devices that support BLE as a communication protocol. Without pairing, BLE may be used to transmit characteristics, which can be referred to as UUIDs, between devices.

Processing system 112 may include one or more processors. Processing system 112 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Application 114 may be executed using processing system 112. The code for application 114 may be stored using one or more non-transitory processor-readable mediums, such as a non-transitory processor-readable medium that is used to store characteristic map 115. Application 114 can represent an application that is installed on client device 110 by a user. Application 114 may be a peripheral device control application that has been released and maintained by a manufacturer or distributor of peripheral devices 120. Application 114 may be programmed for use in configuring peripheral devices 120. For instance, application 114 may be an application released by a manufacturer of peripheral devices 120 that is available for download by a user from an online app store.

As previously detailed, user interface 118 may be a convenient user interface that allows a user to efficiently input text, such as a touchscreen keyboard or a physical keyboard. Characteristic map 115 may be stored using one or more non-transitory processor-readable mediums. Characteristic map 115 may indicate various characteristics (e.g., UUIDs) and values associated with each identifier. The characteristics may be stored in the form of a table or other form of data storage arrangement that maps the characteristic to a value. Wireless interface 116 may be used to transmit and receive values of characteristics. For instance, wireless interface 116 may use BLE to transmit an indication of a characteristic and a value associated with the characteristic. Wireless interface 116 may further receive indications of a characteristic and a value associated with the characteristic. Table 1 represents four example characteristics that may be stored as part of characteristic map 115.

TABLE 1

| Characteristic (UUID) | Format | Purpose |
| --- | --- | --- |
| 00000002-1e3c-fad4-74e2-983F93b0048a | "SSID:password" | This characteristic holds the SSID and password |
| 00000003-1e3c-fad4-74e2-983F93b0048a | [String] | WiFi Status |
| 00000004-1e3c-fad4-74e2-983F93b0048a | "(SSID_0,SSID_1, . . . SSID_n" | List of WiFi SSIDs scanned by peripheral device |
| 00000005-1e3c-fad4-74e2-983F93b0048a | 1/0 | Client writing a 1 to this field triggers SSID scan and transmission of notification of 00000004-1e3c-fad4-74e2-983F93b0048a characteristic |

In Table 1, it should be understood that the number, names, formats, and purposes of the characteristics are merely exemplary. In other embodiments, characteristics may have different values, different formats, be greater or fewer in number, and have varying purposes. Specifically, client device 110 may use the Generic Attribute Profile (GATT) which uses the Attribute Protocol (ATT) to communicate indications of characteristics with peripheral devices 120. Client device 110 may function as the GATT client and each peripheral device may function as the GATT server.

Peripheral device 120-1 may include: processing system 122; wireless interface 124; wireless interface 126; and characteristic map 125. Notably absent may be user interfaces that include: a touchscreen, keyboard, or any other input arrangement that allows for text to be easily input by a user.

Processing system 122 may include one or more processors. Processing system 112 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Characteristic map 125 may store the same characteristics as indicated in Table 1 and as detailed in relation to characteristic map 115. Therefore, both processing system 122 and processing system 112 (by virtue of application 114) can determine the purpose of each characteristic. In some embodiments, an application is executed by processing system 122 to complete the wireless setup process.

Wireless interface uses the same wireless communication protocol as wireless interface 116. For example, BLE may be used for communication between wireless interface 116 and wireless interface 126. To exchange characteristic information, GATT and ATT may be used. When not communicating with another device, wireless interface 126 may advertise the availability of a wireless connection being available with wireless interface 126 of peripheral device 120-1. Advertising data can include a Bluetooth address of the sender. Once a connection has been established with client device 110 (but without pairing), wireless interface 126 may cease advertising a connection. In some embodiments, wireless interface 126 may only advertise when processing system 122 indicates that a wireless network via wireless interface 124 is not connected.

Wireless interface 124 uses a different wireless communication protocol than wireless interface 126. Wireless interface 124 may be used to access a wireless network and the Internet. Wireless interface 124 may require: 1) selection of a wireless network; and 2) wireless network credentials in order to successfully access or pair with a particular wireless network. The communication protocol used by wireless interface 124 may be one of the IEEE 802.11 suite of wireless communication protocols. For instance, a Wi-Fi® communication protocol may be used. In order to successfully join a wireless network that uses an IEEE 802.11 communication protocol, an SSID may be needed to identify the correct wireless network and a password may be needed. Some wireless network access points may broadcast the SSID of the wireless network; other wireless network access points may not broadcast the SSID and may require that the SSID be supplied by the device attempting to join the wireless network. Therefore, in such embodiments, the user may need to obtain the SSID from another source. The password may be a string of alphanumeric characters that is used to authenticate the device attempting to access the wireless network.

Peripheral device 120-2 may contain the same or similar components to peripheral device 120-1. It can be possible for client device 110 to be concurrently in communication with multiple unpaired peripheral devices via wireless interface 116. Such an arrangement can allow a user to provide a single SSID (either by entry or selection) and a single password, which can then be used to configure wireless network access for both peripheral devices 120. In other embodiments, wireless interface 116 may be in unpaired communication with a single peripheral device or more than two peripheral devices.

Client device 110 may be used to select an SSID and provide wireless network credentials for each of peripheral devices 120. Peripheral device 120-1 is within range of wireless network access point 130-1 and wireless network access point 130-2, which each use the wireless communication protocol associated with wireless interface 124. Peripheral device 120-1 may provide an indication of each wireless network to client device 110 via wireless interface 126. Further detail regarding how the connection with the wireless network of peripheral device 120-1 is configured is detailed in relation to FIG. 4. Peripheral device 120-2, as illustrated in system 100, is within range of only wireless network access point 130-1. Accordingly, peripheral device 120-2 may provide an indication of only the wireless network created by wireless network access point 130-1 to client device 110 via wireless interface 126. Therefore, client device 110 receives indications of only wireless networks with which the peripheral devices 120 can communicate.

Figure 2:
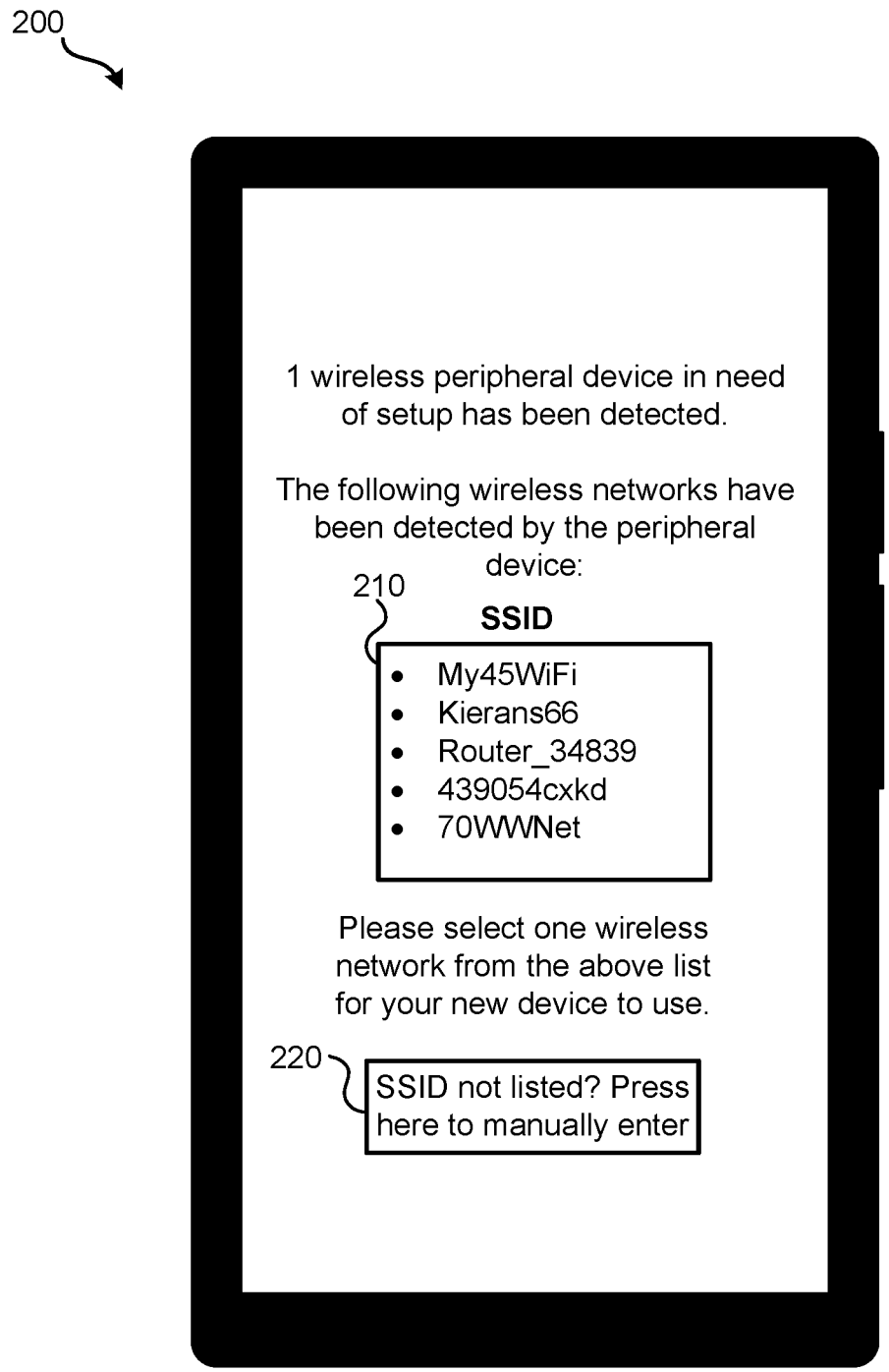
FIG. 2 illustrates an embodiment of a network-selection graphical user interface presented by a client device.

FIG. 2 illustrates an embodiment 200 of a network-selection graphical user interface (GUI) presented by a client device, such as client device 110. After receiving indications wireless networks with which a peripheral device can successfully communicate and are in range, which can be Wi-Fi networks, a user interface can be presented by the client device that allows a user to select a particular wireless network. Each Wi-Fi wireless network may be identified by an SSID. An important aspect to note is that the listed wireless networks are those wireless networks with which the peripheral device, not necessarily the client device, can successfully communicate. Therefore, even if both the client device and the peripheral device are capable of communicating with the same wireless network protocols, since the peripheral device determines which wireless networks are within range, the list may be different than if the client device scanned for available networks.

On a touchscreen, to select a particular wireless network, a user may select an SSID within box 210. In some situations, if an SSID is not available for a network, the user may be permitted to manually type in an SSID, such as by using an on-screen keyboard presented by the touchscreen display. For example, in embodiment 200, a user may press button 220 to manually type in an SSID for a hidden wireless network. Embodiment 200 represents an example GUI; different arrangements may be presented to allow a user to select from among one or more wireless networks detected by the peripheral device.

Figure 3:
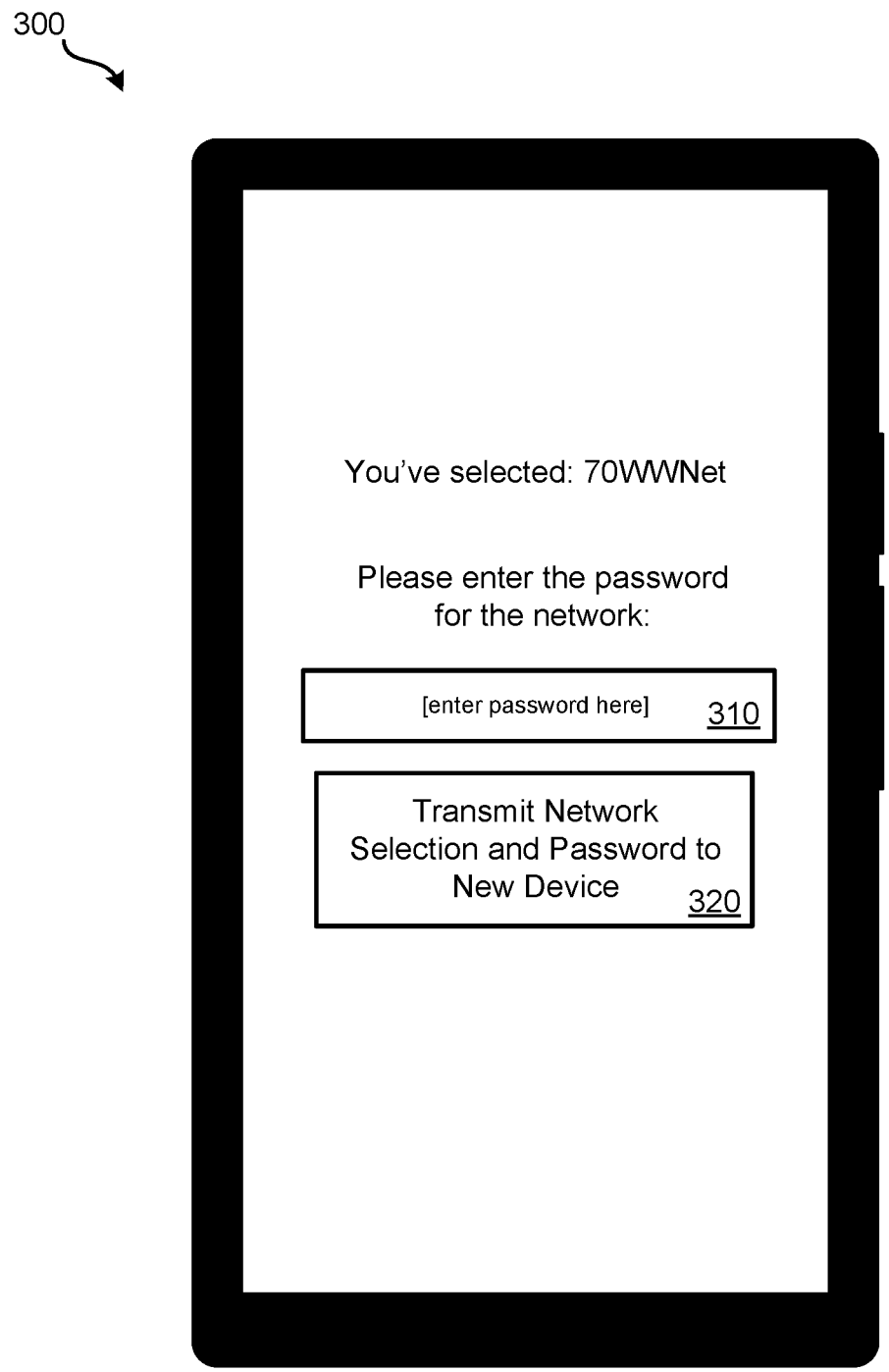
FIG. 3 illustrates an embodiment of a password-input graphical user interface presented by a client device.

FIG. 3 illustrates an embodiment 300 of a password-input GUI presented by a client device, such as client device 110. After receiving selection of an SSID associated with a wireless network with which the user desires the peripheral device to connect, a second GUI may be presented that allows a user to type in a password. For example, when a user selects box 310, an on-screen keyboard may be displayed that allows a user to type directly on the touchscreen to input the password of the selected wireless network. When button 320 is pushed, an indication of the network (e.g., the SSID) and the password may be transmitted to the peripheral device as detailed in relation to FIG. 4. Embodiment 300 represents an example GUI; different arrangements may be presented to allow a user to input a wireless network password and trigger transmission to the peripheral device. For instance, a unified interface may be presented that allows for selection of an SSID and input of a password.

Figure 4A:
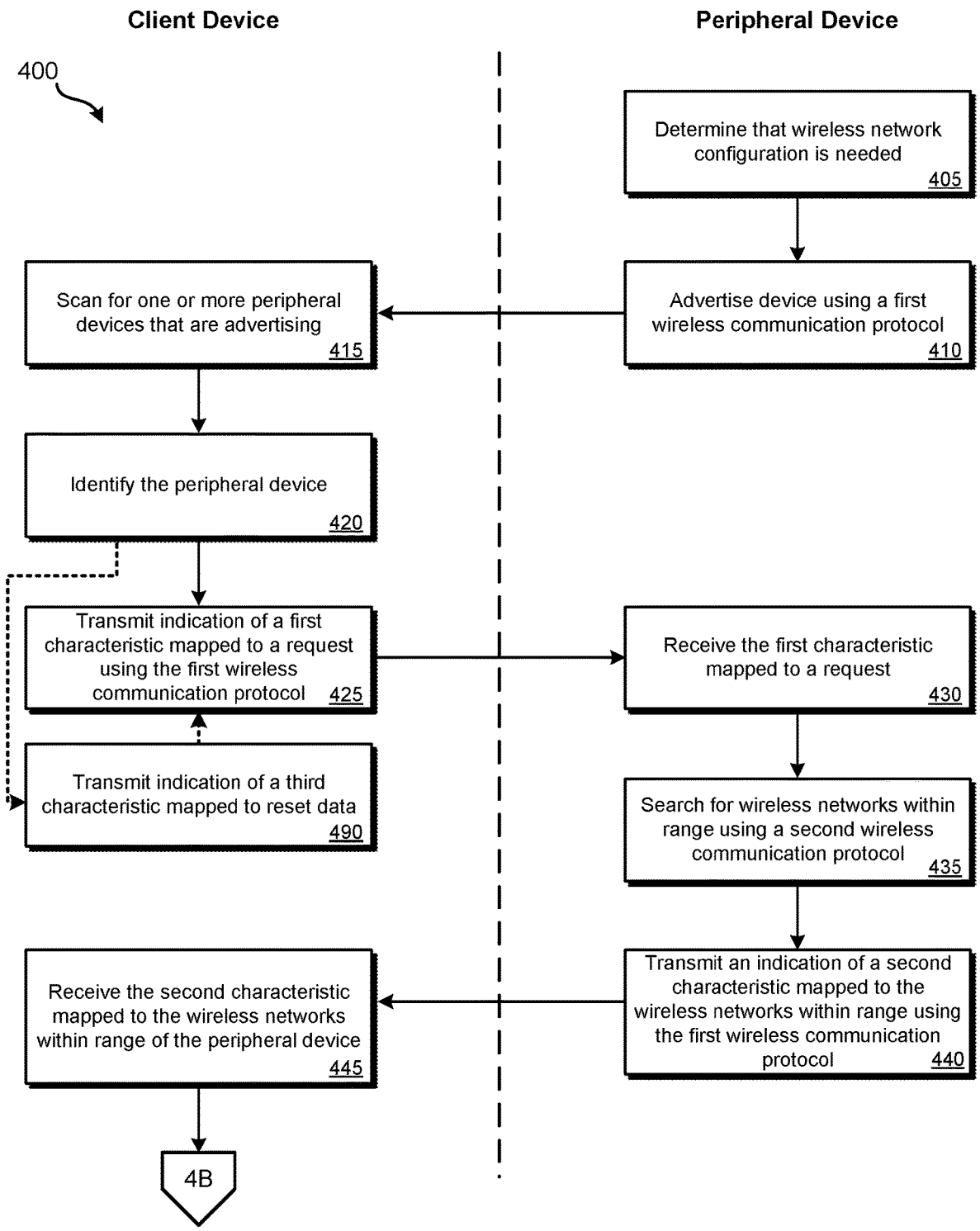
FIGS. 4A, 4B, and 4C illustrate an embodiment of a method for performing remote wireless network setup without pairing.
Figure 4B:
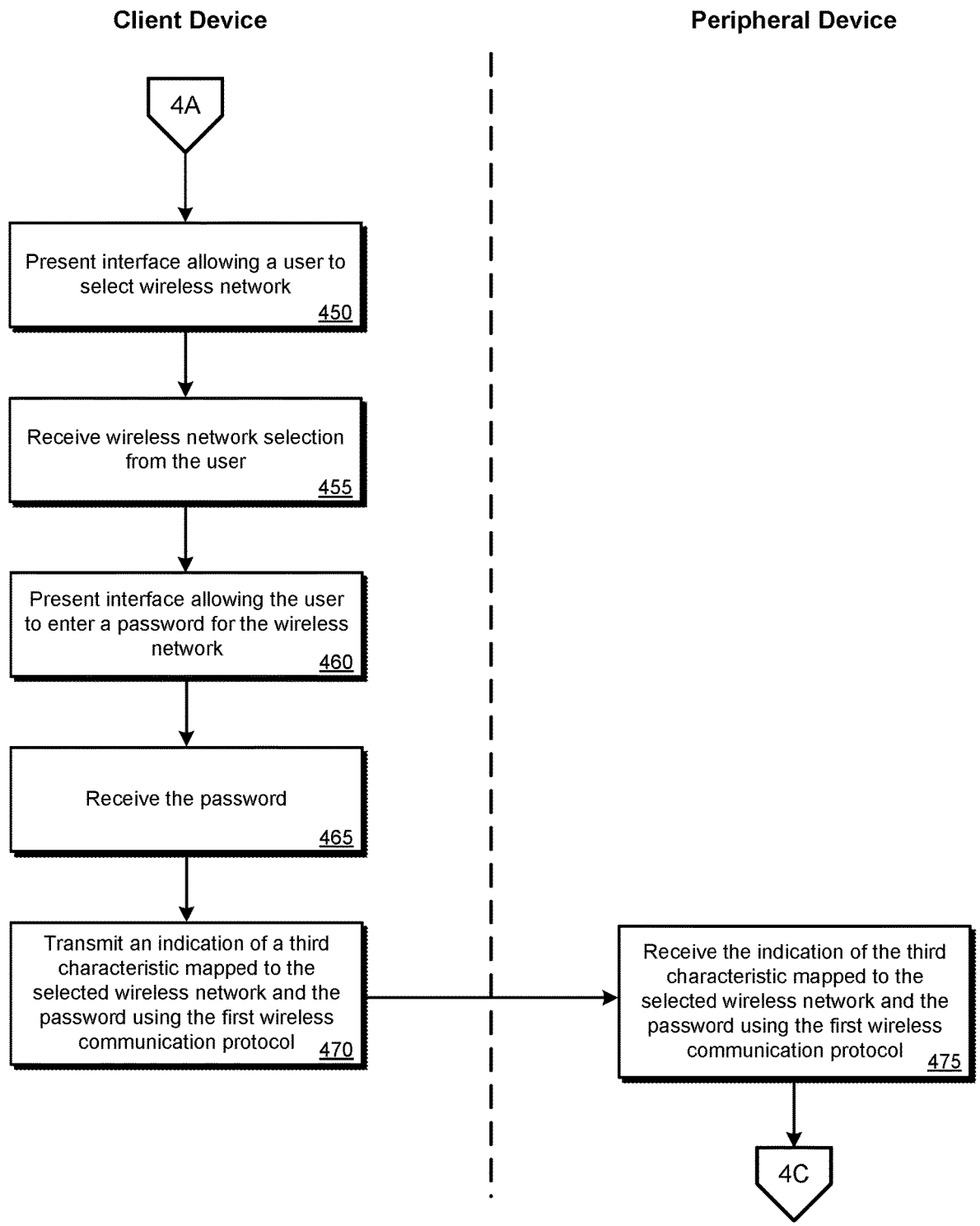
Figure 4C:
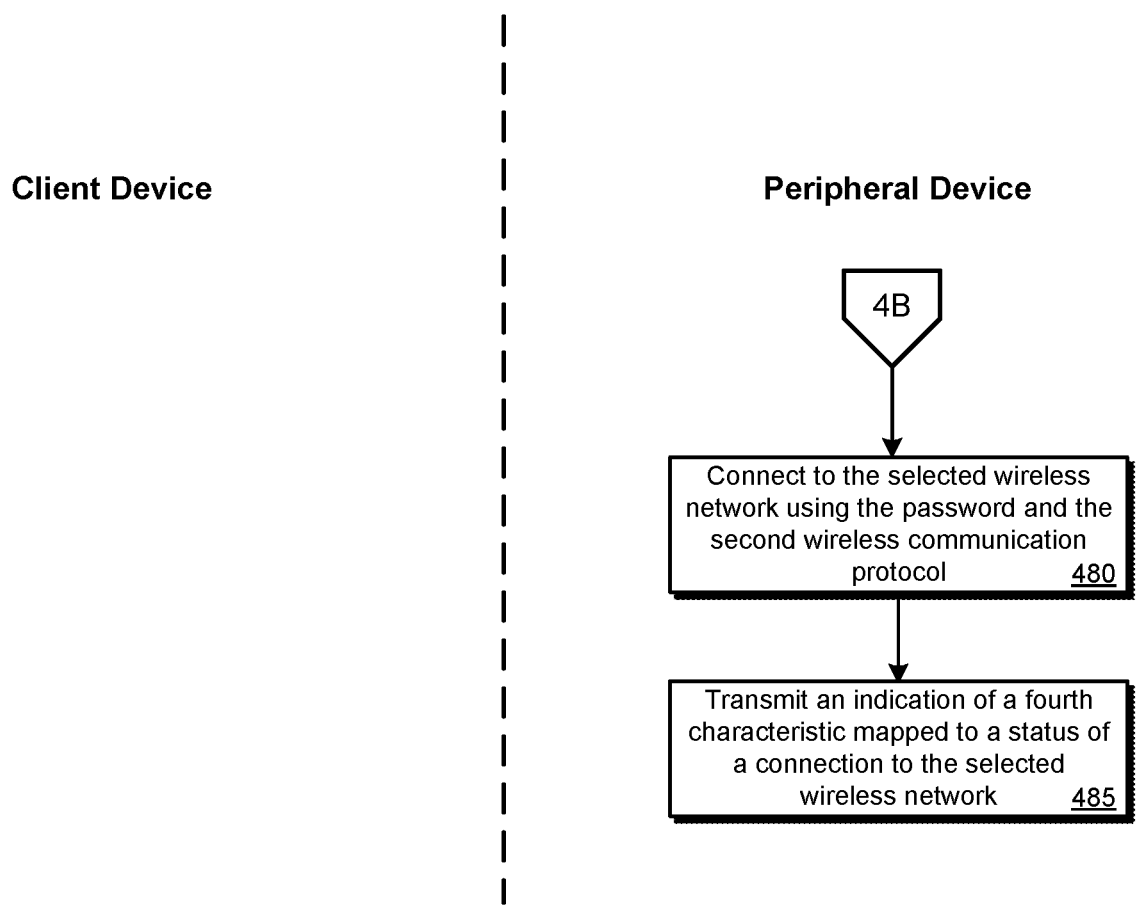

Various methods may be performed using the systems and GUIs detailed in relation to FIGS. 1-3. FIGS. 4A, 4B, and 4C illustrates an embodiment of a method 400 for performing remote wireless network setup without pairing. Method 400 may be performed using system 100. More specifically, method 400 is represented as a swim diagram in which blocks of the left column can be performed by a client device, such as client device 110 of FIG. 1, and blocks of the right column can be performed by a peripheral device, such as peripheral device 120 of FIG. 1.

Method 400 begins with FIG. 4A. At block 405, the peripheral device may determine that wireless network configuration is needed. The processing system of the peripheral device may determine that configuration is needed based on: the peripheral device not currently having data stored indicating an SSID; a previously-configured wireless network no longer being available (e.g., out of range); or wireless credentials for a previously-configured wireless network no longer being valid.

At block 410, the peripheral device may advertise that it is available for communication via a first wireless communication protocol. Block 410 may be performed in response to determining that a wireless configuration is needed at block 405. In other embodiments, block 410 may be performed when the peripheral device is not currently communicating with another device via the first wireless communication protocol. This first wireless communication protocol may be BLE. The advertisement may indicate a device identifier that is specific to the peripheral device, such as a Bluetooth identifier or MAC (media access control) address. The identifier may be unique to distinguish it from other devices; however, the identifier may have a portion of its identifier correspond to a particular manufacturer or model. Alternatively, the identifier may fall within a given numerical range that can be used to determine the type of peripheral device.

At block 415, the client device may scan for one or more peripheral devices that are advertising. Block 415 may be triggered by an application being executed by the client device. The application may be provided by the manufacturer or distributer of the peripheral device. Block 415 may involve having a wireless communication interface monitor for advertisement messages that were transmitted using the first wireless communication protocol. At block 420, one or more peripheral devices for which a wireless network setup is to be performed may be identified. As detailed in relation to FIG. 1, it can be possible for the client device to concurrently set up multiple peripheral devices for communication with a wireless network. For the remainder of the example of method 400, a single peripheral device is set up. Identification of block 420 may be performed by the application being executed by the client device. Identification may be performed by identifying a particular string of characters within the peripheral device's identifier or the peripheral device's identifier falling within a defined range of identifiers defined within the application. Therefore, based on the identifier, the application can determine whether the peripheral device is an appropriate device for which to attempt to configure access to a wireless network.

As part of block 420, a connection between the client device and the peripheral device may be established. However, no pairing may be performed between the peripheral device and the client device. That is, no exchange of encryption information may be performed between the devices. Rather, GATT/ATT may be used for communication between the client device and the peripheral device. The peripheral device may function as the GATT server. This unpaired communication between the peripheral device and client device can be performed without receiving any additional permissions or input from a user. After a successful connection has been made, in some embodiments, the peripheral device may transmit a characteristic mapped to a current Wi-Fi (or other second wireless communication protocol) status.

At block 425, a first characteristic (e.g., UUID) mapped to a request may be transmitted to the peripheral device via the first wireless communication protocol (e.g., BLE). The request mapped to the first characteristic may serve as a trigger for the peripheral device to scan for available wireless networks using the second wireless communication protocol. For example, referring to Table 1, an indication of a first characteristic "00000005-1e3c-fad4-74e2-983F93b0048a" may be transmitted along with a value of 1. By the peripheral device receiving a value of 1 with this first characteristic, the peripheral device may be instructed to perform a search for available Wi-Fi networks.

At block 430, the indication of the first characteristic may be received. According to a stored characteristic map, the peripheral device can determine that the received value in association with the received first characteristic is indicative of a trigger to search for available wireless networks that use the second wireless communication protocol (e.g., Wi-Fi networks). At block 435, the peripheral device may scan for available wireless networks that use the second wireless communication protocol. None, one, or more than one wireless networks may be identified. To be successfully found during the search, each wireless network may require to have a wireless access point within communication range of the peripheral device. Each wireless network may indicate an SSID. One or more wireless networks may not broadcast an SSID.

At block 440, an indication of a second characteristic may be transmitted by the peripheral device via the first wireless communication protocol in association with data indicative of each SSID of the wireless networks that was detected during the scan of block 435. The second characteristic may be the same or similar to characteristic "00000004-1e3c-fad4-74e2-983F93b0048a" of Table 1. For instance, referring to FIG. 2, the transmission of the indication at block 440 may be similar to: "00000004-1e3c-fad4-74e2-983F93b0048a:My45WiFi;" "Kierans66;" "Router_34839;" "439054cxkd; 70WWNet." This characteristic data may be received by the client device at block 445 via the first wireless communication protocol. Based on the characteristic map stored by the client device, the client device can successfully interpret the received characteristic.

For GATT, a maximum transmission unit (MTU) is the largest size packet or frame, specified in octets (eight-bit bytes), that can be sent in a packet- or frame-based network. The default value of MTU for GATT is 23 bytes and is configurable up to a maximum value of 512 bytes. Since the upper bound of 512 bytes exists, the list of wireless networks may need to be transferred in chunks until all the data for the second characteristic has been transmitted. To accomplish this task, the peripheral device may, transfer the data for the second characteristic in the form of notifications transmitted in a periodic manner. The value of the second characteristic may be changed periodically, such as every 1 second, which triggers a notification from the peripheral device to the client device. Since there is no synchronization, there is a possibility that the transmitted notification is not received by the client device. To avoid such a transmitted notification being missed, a synchronization scheme may be used in which an acknowledgement characteristic may be updated when data is successfully received by the client device. In response to the acknowledgement characteristic being updated, the peripheral device can emit a next set of data. This process can repeat until the entire list of wireless networks for the second characteristic has been transmitted to the client device.

Method 400 continues on FIG. 4B. At block 450, a first GUI, such as illustrated in FIG. 2, may be presented that allows a user to select a wireless network based on SSID (or some other form of wireless network identifier). A user may also be presented with an option to type in (or otherwise provide) an SSID for a wireless network that is not broadcasting an SSID (a hidden SSID). At block 455, a user may select the SSID (or enter the SSID) using a user interface (e.g., touchscreen, keyboard) of the client device. At block 460, a second GUI, such as illustrated in FIG. 3, may be presented that allows a user to enter a password for the selected wireless network. An on-screen keyboard or physical keyboard may be used for the user to type in the password corresponding to the SSID. At block 465, the user may input the password. In some embodiments, rather than blocks 450-465 being performed, the client device may determine the correct wireless network with which to connect and may retrieve the password other than through user input. For instance, the correct SSID and password may have been previously supplied to and stored by the application being executed by the client device. Alternatively, the client device may have permission to access data stored by the operating system that indicates a wireless network and password which the client device is accessing.

At block 470, an indication of a third characteristic mapped to the wireless network selected at block 455 and the password received at block 465 may be transmitted via the first wireless communication protocol. For instance, referring to Table 1, the following may be transmitted: "00000002-1e3c-fad4-74e2-983F93b0048a-70WWNet: ThisIsMyPassword%%." In this example, the SSID of the network to be connected to and the password are sent as part of a string of text corresponding to the same characteristic. Encryption may be implemented to protect the privacy of the password. In other embodiments, separate characteristics may be used. At block 475, the indication of the third characteristic along with the accompanying SSID and password may be received via the first wireless communication protocol and interpreted by the peripheral device.

Method 400 continues on FIG. 4C. At block 480, in response to receiving the SSID and the password, the received SSID and password may be stored and used by the peripheral device to connect to a wireless network using the second wireless communication protocol. Therefore, all of the information needed to successfully join a wireless network using the second wireless communication protocol (e.g., Wi-Fi) may have been received using a first wireless communication protocol (e.g., BLE) from the client device. At block 485, an indication of a fourth characteristic may be transmitted along with data indicative of a status of a connection to the selected wireless network. For instance, statuses of a connection to the wireless network can include: connected; not connected; connection in progress; and inactive. Therefore, for example "00000003-1e3c-fad4-74e2-983F93b0048a—wpa_state:CONNECTED" may be transmitted at block 485. The client device may receive and read this characteristic and may, in response, output an indication to the user via a display that indicates the status of the wireless network connection made using the second wireless network communication protocol.

Returning to FIG. 4A, after method 400 has been initially performed and a wireless network connection has been set up for the peripheral device, at block 490 it can be possible for the client device to transmit clearing data that causes the peripheral device to no longer communicate with the previously set up wireless network. The client device transmits an indication of the third characteristic, which is indicative of the wireless network (e.g., SSID) and a password to be used by the peripheral device that contains null data or some other form of data indicating that the peripheral device should "forget" the previously selected wireless network. The third characteristic along with the clearing data may be transmitted to the peripheral device and received at block 430. Method 400 may then proceed to block 425 or directly to block 435.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing wireless network setup without pairing, the method comprising:
 scanning, by a client device, for a peripheral device that is advertising a wireless connection using a first wireless communication protocol;
 identifying, by the client device, the peripheral device that is advertising the wireless connection using the first wireless communication protocol;
 storing, by the client device, a first characteristic map, wherein:
  the first characteristic map comprises a plurality of universally unique identifiers (UUIDs), each UUID of the plurality of UUIDs is mapped to a corresponding characteristic; and
  a second characteristic map, that matches the first characteristic map, is stored by the peripheral device;

after identifying the peripheral device and without pairing with the peripheral device, transmitting, by the client device, using the first wireless communication protocol, a request mapped to a first UUID mapped to a first characteristic;

in response to the request mapped to the first UUID mapped to the first characteristic, transmitting, by the peripheral device, using the first wireless communication protocol, a listing of one or more wireless networks within range mapped to a second UUID mapped to a second characteristic, wherein each wireless network of the one or more wireless networks using a second wireless communication protocol;

receiving, by the client device, input selecting a wireless network from the one or more wireless networks and input indicating a password of the selected wireless network;

transmitting, by the client device, using the first wireless communication protocol, a third UUID mapped to a third characteristic mapped to the selected wireless network and the password; and connecting, by the peripheral device, to the selected wireless network using the password and the second wireless communication protocol.

2. The method for performing the wireless network setup without pairing of claim 1, wherein scanning for the peripheral device that is advertising the wireless connection using the first wireless communication protocol comprises scanning within a defined range of device addresses.

3. The method for performing the wireless network setup without pairing of claim 2, wherein a peripheral device control application installed on the client device identifies the peripheral device that is advertising the wireless connection using the first wireless communication protocol.

4. The method for performing the wireless network setup without pairing of claim 1, wherein the first wireless communication protocol is Bluetooth Low Energy (BLE) and the second wireless communication protocol is an IEEE 802.11 protocol.

5. The method for performing the wireless network setup without pairing of claim 1, further comprising:
transmitting, by the peripheral device, using the first wireless communication protocol, a fourth characteristic mapped to wireless network status data for the second wireless communication protocol.

6. The method for performing the wireless network setup without pairing of claim 1, further comprising:
presenting, by the client device, a first graphical user interface that allows a user to select the wireless network from the listing of one or more wireless networks within range of the peripheral device;
receiving, by the client device, selection of the wireless network from the first graphical user interface; and
presenting, by the client device, a second graphical user interface that allows the user to input the password for the wireless network.

7. The method for performing the wireless network setup without pairing of claim 1, wherein the peripheral device is a headless device.

8. The method for performing the wireless network setup without pairing of claim 7, wherein the peripheral device is further a streaming media player configured to connect with a television.

9. The method for performing the wireless network setup without pairing of claim 8, wherein the client device is a smartphone.

10. A system for performing wireless network setup without pairing, the system comprising:
a client device, comprising:
a first wireless communication interface that communicates using a first wireless communication protocol;
a user interface;
one or more processors that communicate with the first wireless communication interface and the user interface, wherein the one or more processors are configured to:
scan, using the first wireless communication interface, for a peripheral device that is advertising a wireless connection using the first wireless communication protocol;
identify the peripheral device that is advertising the wireless connection using the first wireless communication protocol;
store a first characteristic map, wherein:
the first characteristic map comprises a plurality of universally unique identifiers (UUIDs), each UUID of the plurality of UUIDs is mapped to a corresponding characteristic; and
a second characteristic map, that matches the first characteristic map, is stored by the peripheral device;
after identifying the peripheral device and without pairing with the peripheral device, cause a request mapped to a first UUID that is mapped to a first characteristic to be transmitted by the first wireless communication interface using the first wireless communication protocol;
cause a third UUID mapped to a third characteristic that is mapped to a selected wireless communication and a password to be transmitted to the peripheral device via the first wireless communication interface using the first wireless communication protocol; and
the peripheral device, comprising:
a second wireless communication interface that communicates using the first wireless communication protocol;
a third wireless communication interface that communicates using a second wireless communication protocol; and
one or more processors in communication with the second wireless communication interface and the third wireless communication interface, wherein the one or more processors are configured to:
in response to receiving the request mapped to the first characteristic, cause a listing of one or more wireless networks mapped to a second UUID that is mapped to a second characteristic to be transmitted using the second wireless communication interface, wherein:
each wireless network of the one or more wireless networks uses the second wireless communication protocol and is within range of the second wireless communication interface;
receive the third characteristic mapped to the selected wireless communication and the password via the second wireless communication interface using the first wireless communication protocol; and
connect to the selected wireless network using the password and the third wireless communication interface.

11. The system for performing the wireless network setup without pairing of claim 10, wherein the one or more processors of the client device being configured to scan for the peripheral device that is advertising the wireless connection using the first wireless communication protocol comprises the one or more processors being configured to select the peripheral device based on an identifier of the peripheral device being within a defined range of MAC (Media Access Control) addresses or Bluetooth addresses.

12. The system for performing the wireless network setup without pairing of claim 11, further comprising:
 a peripheral device control application installed on the client device that identifies the peripheral device that is advertising the wireless connection using the first wireless communication protocol.

13. The system for performing the wireless network setup without pairing of claim 10, wherein the first wireless communication protocol is Bluetooth Low Energy (BLE) and the second wireless communication protocol is an IEEE 802.11 protocol.

14. The system for performing the wireless network setup without pairing of claim 10, wherein the one or more processors of the peripheral device are further configured to cause a fourth characteristic mapped to second wireless communication protocol status data to be transmitted using the second wireless communication interface.

15. The system for performing the wireless network setup without pairing of claim 10, wherein the one or more processors of the client device are further configured to:
 cause the user interface to present a first graphical user interface that allows a user to select the wireless network from the listing of one or more wireless networks within range of the peripheral device;
 receive selection of the wireless network from the first graphical user interface; and
 cause the user interface to present a second graphical user interface that allows the user to input the password for the wireless network.

16. The system for performing the wireless network setup without pairing of claim 10, wherein the peripheral device is a headless device.

17. The system for performing the wireless network setup without pairing of claim 16, wherein the peripheral device is further a streaming media player comprising a port for use in outputting video to a television.

18. The system for performing the wireless network setup without pairing of claim 17, wherein the client device is a smartphone.

\* \* \* \* \*